United States Patent

Pinnow

[15] 3,641,693
[45] Feb. 15, 1972

[54] MAGNETIC TIP-UP SIGNAL FOR ICE FISHING

[72] Inventor: James E. Pinnow, Racine, Wis.
[22] Filed: Jan. 11, 1971
[21] Appl. No.: 105,164

[52] U.S. Cl. ..............................43/17, 24/201 B, 116/132, 116/173
[51] Int. Cl. .......................................................A01k 97/12
[58] Field of Search ............116/132, 114, 173; 43/17, 17.2, 43/17.5; 24/73 MS, 201 B, 222 SF, 230.5 MH; 287/DIG. 12; 213/75

[56] References Cited

UNITED STATES PATENTS

| 2,226,287 | 12/1940 | Miller | 213/75 |
| 2,608,783 | 9/1952 | Rodgers | 43/17 |
| 2,654,176 | 10/1953 | Kachelski et al. | 43/17 |
| 2,811,802 | 11/1957 | Schmidt | 43/17 |
| 3,213,561 | 10/1965 | Roemer | 43/17 |
| 3,352,048 | 11/1967 | Fleming | 43/17 |

FOREIGN PATENTS OR APPLICATIONS 374,845  3/1964  Switzerland..........................24/201 B Primary Examiner—Louis J. Capozi
Attorney—Axel H. Johnson

[57] ABSTRACT

An ice-fishing signal device comprising a line reel submerged in a hole in the ice, which reel rotates when a fish is caught on the line. A pair of magnets are superimposed axially and face to face; one being fixed for rotation with the reel, and the other nonrotatable and fixed integrally with a flagstaff. The signal is initially set with the poles of the magnets so related that the unlike, opposed poles thereof are mutually aligned, thus maintain positive magnetic contact between the magnets. Rotation of the reel when the line is being unwound by a fish, rotates the magnet that is integral with the reel, thus breaking the magnetic attraction and permitting the flag to assume an erect position and indicating that a fish is on the line.

9 Claims, 9 Drawing Figures

INVENTOR
JAMES E. PINNOW

PATENTED FEB 15 1972

INVENTOR
JAMES E. PINNOW
BY
Axel H. Johnson,
AGT.

MAGNETIC TIP-UP SIGNAL FOR ICE FISHING

BACKGROUND OF THE INVENTION

1. Field of the Invention

This invention relates to a signal device employed to indicate the presence of a fish on the line when ice fishing.

2. Description of the Prior Art

Prior art devices of this nature comprise various mechanically actuated trip mechanisms which release a flag and permits the latter to extend upwardly and indicate the presence of a fish on the line. The applicant is not presently aware of related prior art patents.

SUMMARY OF THE INVENTION

This invention concerns a signal device employed by fishermen when fishing through a hole in the ice covering a body of water. The fishermen frequently sets up a number of these signal devices and watches them from a convenient position.

These devices embrace a means to signal the presence of a fish on the line, usually by a flag on a staff. The device is initially set so that the flag support staff is in a horizontal position. When the signal is tripped, the flagstaff assumes an upright position.

The device of this invention employs a pair of magnets of the type known as cobalt magnets, and having "N" and "S" poles; one magnet being mounted to rotate with a line reel and coaxial therewith. The other magnet is secured to a flexible flagstaff. When the device is set for signalling, the staff is flexed so as to position the magnets face to face, with the opposed magnetic poles thereof in mutual alignment. An indicating means is provided relative to each magnet to indicate the setting position. When a fish causes a rotation of the reel by unwinding the line, the magnetic forces retaining the magnets in mutual contact is broken, releasing the flag to an upright position. An object, therefore, of this invention is to provide a reliable signal device having as the controlling means thereof a pair of magnets rotatable relative to each other.

Further objects and advantages of this invention will become apparent from a consideration of the following detailed description taken in connection with the accompanying drawings wherein an embodiment of the invention is shown. It is, however, to be understood that the invention is not limited to the details disclosed, but includes all such variations as fall within the spirit of the invention.

Referring to the drawings.

Figure 2:
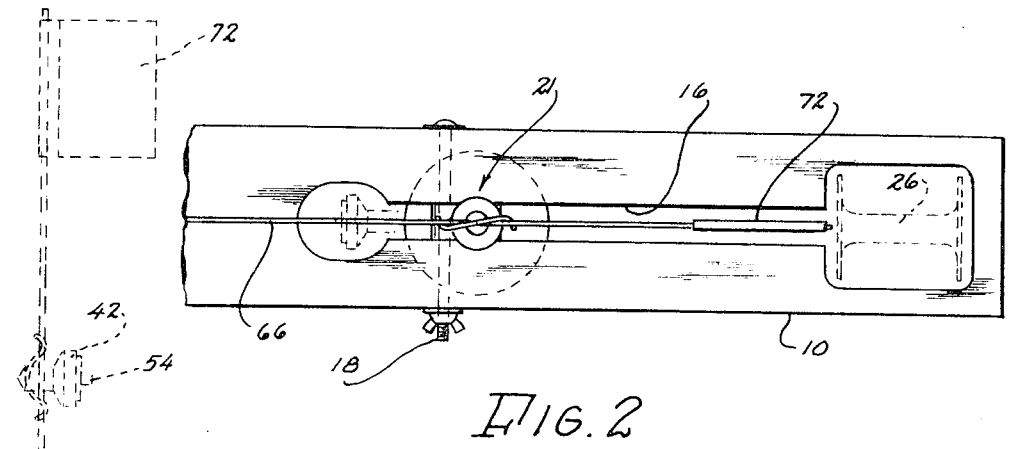
FIG. 2 is a plan view with parts broken away.

The preferred form of this signal device comprises a base 10 of suitable material such as wood, and of a length to span a hole in the ice of a convenient size. A tubular member 12 is mounted in a pivoted block 14, the latter being pivoted in a slot 16 of base 10 about a bolt 18 to permit securing the device vertically relative to the base, and also to permit the folding of the device into the base 10 for storage when not in use.

Tubular member 12 surrounds a shaft 20 which is journaled for rotation in bearings 22 and 24 which are inserted in the member 12 at the lower and upper ends thereof, respectively.

A line reel 26 is threadedly secured to the lower end of shaft 20 and a locknut 28 secures the reel against rotation relative to the shaft.

Bearing 22 is provided with an enlargement 30 having a flange 32. A line guide 34 is supported for rotation about the enlargement 30 by means of a ring 36 which is free to rotate about the axis of shaft 20 in response to the direction of the pull on the line 38. The upper end of shaft 20 is threaded to receive a control unit 21 comprising a lower magnet hub 40. An upper magnet hub 42 is positioned coaxially over hub 40 when the device is set for signaling. A locknut 44 secures hub 40 against rotation relative to shaft 20.

Figure 1:
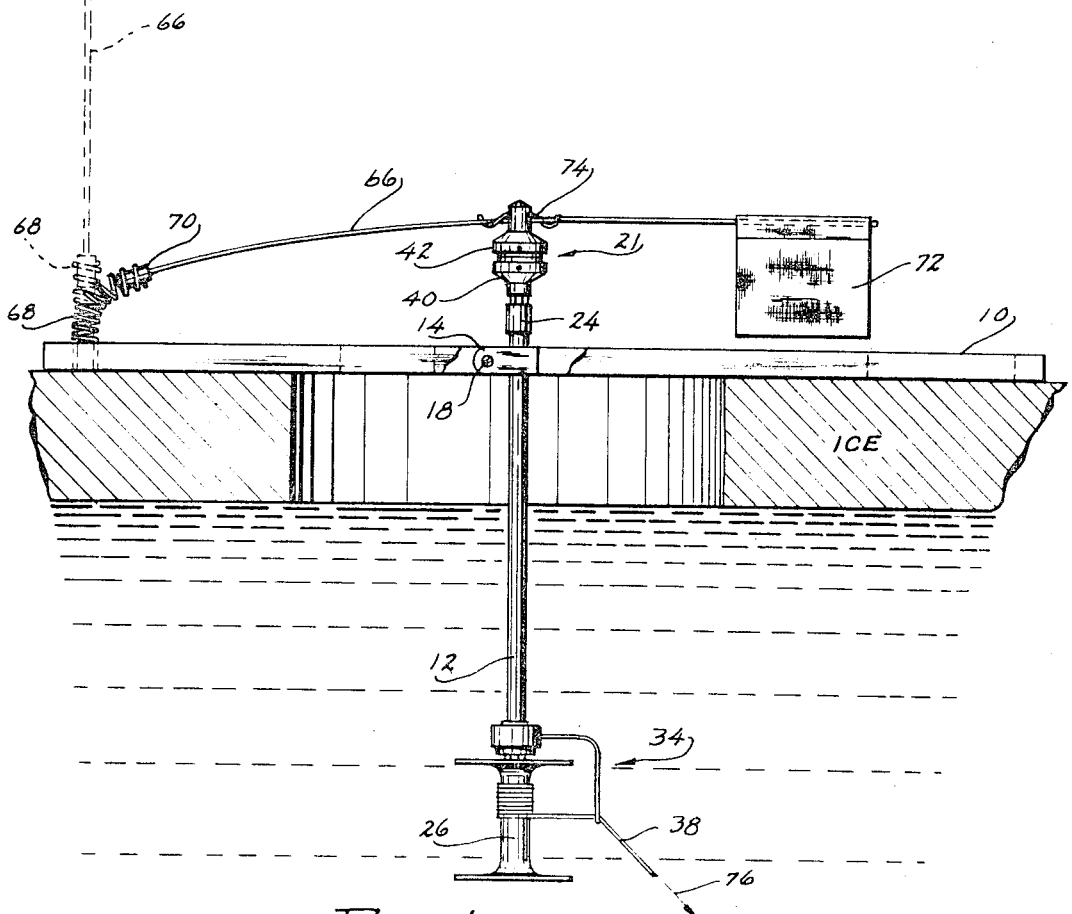
FIG. 1 is an elevational view of the device mounted over a hole in the ice of a body of water, and set for actuation, with the flag also as released shown in dotted lines.
Figure 4:
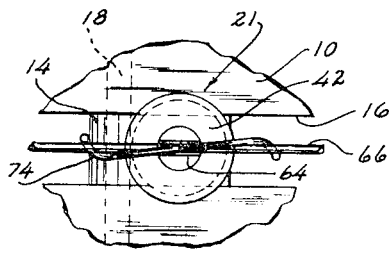
FIG. 4 is a fragmentary plan view of FIG. 3.
Figure 7:
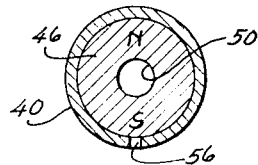
FIG. 7 is a section taken at 7—7 of FIG. 6.
Figure 9:
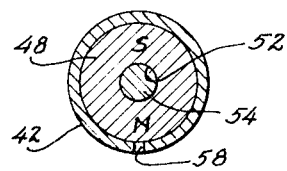
FIG. 9 is a section taken at 9—9 of FIG. 8.
Figure 6:
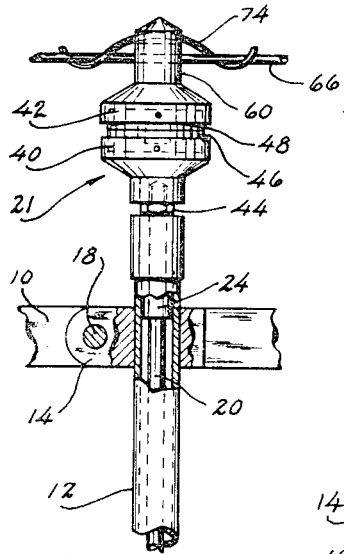
FIG. 6 is an enlarged view of a portion of FIG. 3.
Figure 6:
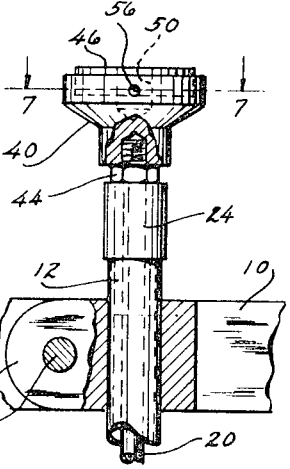
Figure 8:
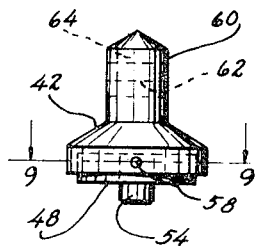
FIG. 8 is an enlarged view of a portion of FIG. 3.
Figure 3:
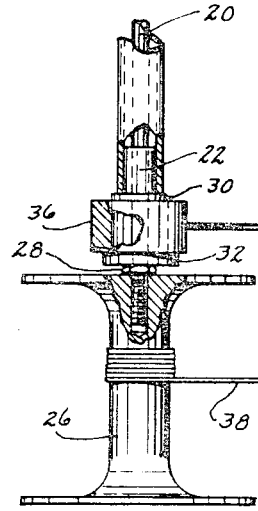
FIG. 3 is an enlarged view of a portion of FIG. 1.
Figure 5:
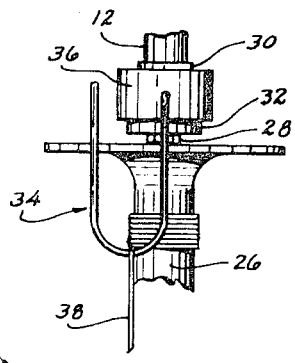
FIG. 5 is a fragmentary view of a portion of FIG. 3.

The gist of this invention is the provision of identical lower and upper disk magnets 46 and 48 respectively, and having central apertures 50 and 52. Each of these magnets have diametrically opposed "N" and "S" poles as shown in FIGS. 7 and 9. Magnet 46 is mounted in a recess in hub 40 and is secured integrally therein by a suitable adhesive or by some other means. Magnet 48 is similarly mounted in a recess in hub 42; however hub 42 is provided with a centering pin 54 which freely enters aperture 50 when magnets 46 and 48 are in face-to-face contact as shown in FIGS. 1 and 3. In order for the signal device to function as intended when set as shown in FIGS. 1 and 3, the following relationship of the magnets must exist: The poles "S" and "N" of magnet 48 are superimposed over poles "N" and "S" of magnet 46, thus providing the magnetic force necessary to maintain a positive contact between the magnets. This function of the magnets 46 and 48 is explained by the rule of physics that " like poles repel, and unlike poles attract." In order to assure alignment of the magnets 46 and 48 with respect to the poles, reference marks 56 and 58 are provided in hubs 40 and 42 in the form of drilled apertures; however, other markings such as a punch mark is satisfactory. The reference mark 56 establishes the position of the "S" pole of magnet 46, and mark 58 establishes the position of the "N" pole of magnet 48. Thus when the reference marks 56 and 58 are circumferentially aligned as in FIG. 3, the magnetic attraction between magnets 46 and 48 are at the maximum and maintains the setting when using the signal device. Hub 42 terminates upwardly in a shank 60 having a hole 62, and a transverse open slot 64 as shown in FIG. 4.

The signal means comprises a flagstaff 66 of flexible material such as steel or other metal and is inserted through hole 62 of the shank 60. A spiral spring member 68 is suitably and securely mounted in an upright hole in said base 10 and spaced transversely from the tubular member 12 as shown in FIG. 1, and is of a length to provide the necessary resiliency. The staff 66 is provided with a plug 70 secured thereto and which plug is forced into the inner bore of the spring 68, thus providing a resilient support for the staff 66. The normal released position of the staff is upwardly as shown in FIG. 1 in dotted lines. The staff 66 terminates at the opposite end in a signal flag 72 of cloth or other suitable material, and is usually red in color.

In order to assure that pin 54 of hub 42 will align with aperture 50 of magnet 46 when the signal device is set to operate, a spring clip 74 is provided. This clip is seated in slot 64 and is formed so as to embrace staff 66 as shown in FIG. 3. This clip permits freedom for magnets 46 and 48 to seat freely with their faces in mutual contact when the signal device has been set for operation.

When using this device, the base 10 is positioned across the hole in the ice as shown in FIG. 1, with line 38 unreeled in the direction of arrow 76, and supported in guide 34. Staff 66 is flexed laterally to a position permitting magnet 48 to rest upon magnet 46 while also circumferentially aligning mark 56 with mark 58 by rotating reel 26, and as shown in FIGS. 1 and 3. The device is now set to signal the presence of a fish on the line 38 by merely a quarter of a turn of the reel 26 in either direction of rotation, thus releasing the staff 66 and permitting it to extend upright.

The above being a complete description of an illustrative embodiment of the invention, what is claimed as new and desired to be secured by Letters Patent of the United States is:

1. In a signal means for use in fishing, comprising a base, a shaft having a perpendicular axis and journaled for rotation relative to said base and extending downwardly therefrom, said shaft extending upwardly to terminate in a control unit, an upwardly directed flagstaff mounted upon said base and spaced from said shaft, said staff yieldable relative to said base in a plane common to said axis, said control unit comprising a lower hub integral with said shaft, an upper hub positioned above said lower hub, a lower magnet position in said lower hub and defined by an upper face, an upper magnet positioned in said upper hub and defined by a lower face, said magnets being positioned with said faces in mutual contact by virtue of the magnetic attraction thereof, said staff brought to bear integrally with said upper hub and tending to separate said upper magnet from said lower magnet, and to assume an upright position upon rotation of said lower magnet and interrupting of said magnetic attraction.

2. In a signal means as set forth in claim 1, in which said shaft terminates at the lower end thereof in a reel.

3. In a signal means as set forth in claim 1, in which said lower and upper hubs are coaxial with said axis.

4. In a signal means as set forth in claim 1, in which said lower and upper magnets are cylindrical and coaxial with said axis.

5. In a signal means as set forth in claim 4, in which said magnets have a central aperture defined by said axis.

6. In a signal means as set forth in claim 5, in which said upper hub has a centering pin for insertion in the said central aperture of said lower magnet.

7. In a signal means as set forth in claim 1, in which said lower and upper hubs are provided with peripheral reference marks to indicate orientation of the magnetic poles of said lower and upper magnets.

8. In a signal means as set forth in claim 1, in which said staff is provided with a signal flag at a position upwardly from said base.

9. In a signal means as set forth in claim 1, in which said staff is supported in said base by means of an upwardly directed coil spring.

* * * * *